Feb. 17, 1953          L. R. WOSIKA          2,628,767
COLLECTOR STRUCTURE FOR AXIAL
FLOW ROTARY GAS COMPRESSORS
Filed Dec. 21, 1948

INVENTOR
L. R. WOSIKA
BY
ATTORNEY

Patented Feb. 17, 1953

2,628,767

UNITED STATES PATENT OFFICE 2,628,767

COLLECTOR STRUCTURE FOR AXIAL FLOW ROTARY GAS COMPRESSORS

Leon R. Wosika, San Diego, Calif., assignor to Solar Aircraft Company, San Diego, Calif., a corporation of California Application December 21, 1948, Serial No. 66,533

7 Claims. (Cl. 230—120)

This invention relates to axial flow rotary gas compressors such as are employed in gas turbine engines although it is in no sense limited to such engines. More specifically, the invention relates to the collector structure for receiving the compressed gas or air from the annular discharge orifice of a rotary compressor and conveying it to a point of usage.

An object of the invention is to provide a high efficiency in the handling and conveying of the output of an axial flow rotary gas compressor.

Another object is to reduce the velocity and increase the pressure of the gas discharged from an axial flow rotary compressor whereby turbulent flow within the collector is reduced and losses correspondingly reduced.

Another object is to provide a collector of the type referred to that can be economically manufactured and assembled and is relatively strong.

More specific objects and features of the invention and the manner in which they are achieved will become apparent from the description to follow of a preferred embodiment of the invention.

In a rotary gas compressor of a type that is commonly used in gas turbine engines, the compressor rotor is of relatively large diameter and has protruding from its peripheral surface vanes that are relatively short radially. The air during its passage through the compressor is acted upon alternately by rotating rotor vanes and stationary stator vanes arranged in an annular path, and the compressed air emerges from the last set of vanes (usually stator vanes) in an annular path at relatively high velocity. In conveying gases through ducts and the like, losses increase with the velocity of the gas because of the surface frictional effects and because of eddies and turbulence, which result in conversion of pressure and velocity energy into heat. It is customary with this type of compressor to convey the air discharged from the annular discharge orifice of the compressor into an annular collector ring from which it flows into a pipe for delivery to the point of usage. The annular collector ring is frequently in the form of a spirally expanding scroll, and special deflecting vanes have been employed in the collector structure to impart a peripheral velocity to the gas and help change its direction to a peripheral flow in the spiral scroll. The changes in direction of the gas flowing at high velocity have introduced considerable losses due to turbulence and eddy currents. It has been usual to make the deflector blades or vanes of curved aerodynamic form but I have found that vanes of such shape are objectionable in that the blades must be of substantial thickness thereby occupying a portion of the passage space that the air would otherwise occupy.

The present invention differs essentially from the prior known structural design mentioned, in the use of an annular passage of expanding cross section in downstream direction between the annular discharge orifice and the spiral collector ring, with straight inclined vanes of relatively short length in the passage. This provides relative straight paths for the air as it expands, and reduces the losses normally associated with the vanes of aerodynamic shape. The straight vanes also simplify the operation of casting the vanes integral with the hub from which they extend. Further in accordance with the invention, the outer ends of the vanes extending from the inner wall member are wedged like a cork in the flared outer wall member of the annular passage, thereby positively aligning the inner member and providing direct radial support for a bearing which may be mounted in the inner member for rotatably supporting the shaft of the compressor rotor.

Referring now to the drawing.

Figure 1:
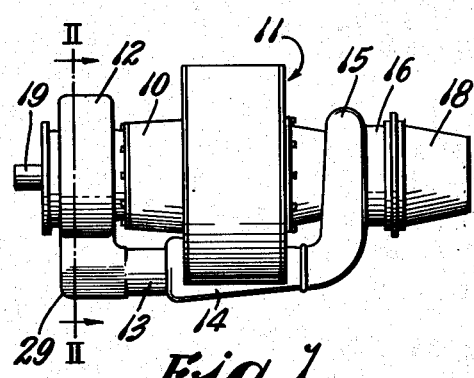
Fig. 1 is a plan view of a gas turbine engine assembly including a compressor and compressor collector structure in accordance with the invention.

Referring to Fig. 1, there is shown a simple gas turbine comprising an air compressor 10 of axial flow type which receives air at one end as indicated by the arrow 11, compresses it, and delivers it through a scroll 12 and a pipe 13 to a combustion chamber 14 where it is mixed with a suitable fuel and burned, the products of combustion being delivered to a gas turbine 16 through a scroll 15. After passing through the gas turbine 16 the gases are exhausted through an exhaust orifice 18. Both the air compressor 10 and the turbine 16 contain rotors mounted on a common shaft 19 which is seen projecting from the left end of the assembly in Fig. 1.

Figure 3:
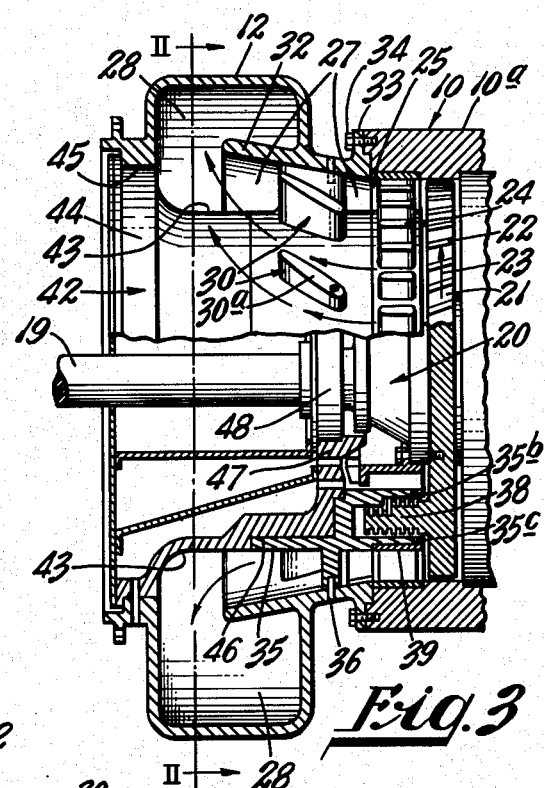
Fig. 3 is a view partially in elevation and partially in section, the section being taken in the vertical line III—III of Fig. 2.
Figure 2:
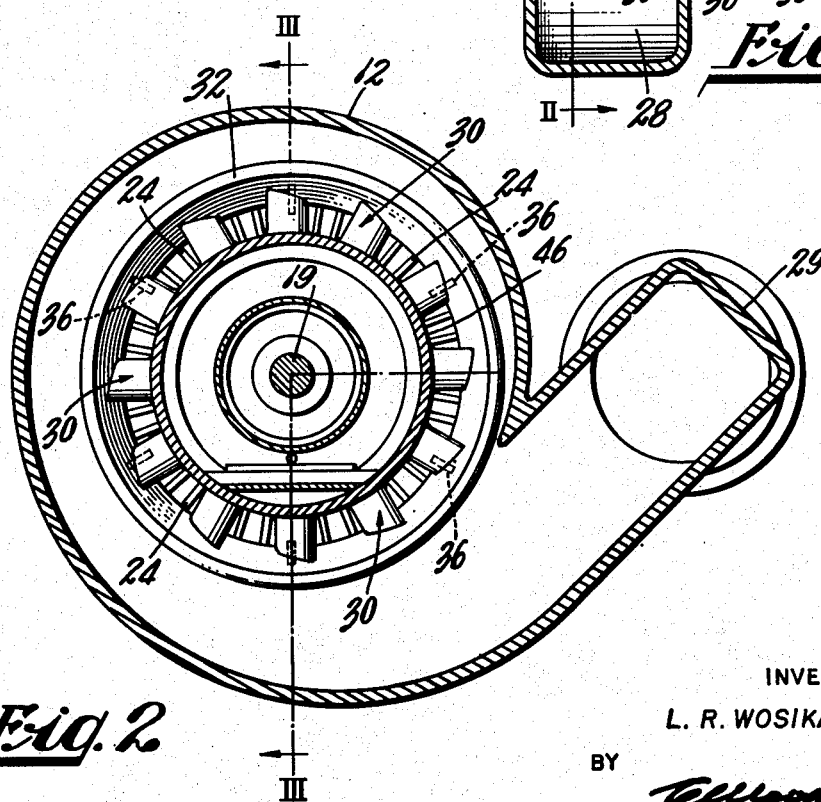
Fig. 2 is a cross section taken in the plane II—II of Figs. 1 and 3.

The compressor itself does not constitute a part of the present invention and therefore only the discharge end thereof is shown in detail in the drawing. Referring to Fig. 3, the compressor contains a rotor 20 mounted on the shaft 19 and having a plurality of axially spaced rotor vane assemblies only the last one 21 of which appears in Fig. 3. The vanes 22 of this vane assembly 21 are so inclined with respect to the direction of rotation (indicated by the arrow 23) as to impart additional velocity and pressure to the air moving therethrough from right to left, and deliver it through a set of conventional stator blades 24 which customarily are curved and provided with a trailing edge inclination of approximately 30° in practice as is well known. After passing vanes 24, the air passes through an annular discharge orifice 25 where it is received by the collector structure of the present invention.

The collector structure defines an annular passage 27 that is of the same cross sectional shape and size as the annular discharge orifice 25 at its right (upstream) end, but that is of expanding cross section in downstream direction so that the air is discharged from the passage 27 through a discharge orifice of substantially larger area into the spiral scroll passage 28 from which it is delivered through an elbow 29 (Fig. 1) into the discharge pipe 13. Positioned within the annular passage 27 is a plurality of circumferentially distributed vanes 30 which are substantially flat, extend radially, and are inclined helically so as to impart to the air passing therethrough a tangential or peripheral velocity component that directs it in proper direction through the expanding spiral scroll passage 28. The vanes 30 are preferably shorter axially than the passage 27 so that they occupy only the mid-portion thereof. This reduces their obstructing effect on the air flow therebetween. By virtue of the radially expanding cross section of the passage 27 in the direction of flow, and the short, straight vanes 30, the speed or velocity of the air is materially reduced during its flow through the passage 27 so that there is comparatively little turbulence within the scroll passage 28.

The outer wall member 32 of the duct means defining the annular passage 27 is shown formed integrally with the annular collecting ring 12, extending substantially halfway thereinto. The forward end of the wall 32 is provided with an outwardly extending flange 33 that may be secured as by screws 34 to the rear end of the outer casing 10a of the compressor 10.

The main portion of the inner wall of the passage 27 is defined by a casting 35 with which the vanes 30 are integrally formed. The outer ends 30a of the vanes 30 are shaped to fit snugly against the inner tapered surface of the wall 32, thereby providing firm radial support and centering of the casting 35 with respect to the outer casing of the machine. This casting 35 may be locked in position with respect to the wall 32 by means of radially extending dowels 36 which extend through the wall 32 and into certain of the vanes 30. The casting 35 may include a pair of forwardly extending annular walls 35b and 35c which cooperate with an annular labyrinth flange 38 on the rotor 20 to reduce air leakage inwardly around the rear end of the rotor. The forwardly extending wall member 35c may also constitute the inner wall of the compressor discharge orifice 25 and support a band 39 which in turn supports the last set of stator vanes 24 of the compressor.

The remainder of the inner wall of the annular passage 27, and of the spiral scroll passage 28, is defined by a member 42 generally annular in shape and having an outer surface 43 the upstream portion of which is substantially cylindrical and continuous with the outer surface of the member 35. The rear end of this member 42 is flared outwardly to a larger cylindrical surface 44 that fits within an internal cylindrical surface 45 at the rear end of the scroll case 12. Forwardly of the surface 43, the external cylindrical surface 46 of the member 42 is of reduced diameter to fit within the rear end of casting 35. The members 42 and 35 are therefore in mutually supporting relation to each other. At its forward end, the member 42 is extended inwardly as indicated at 47 and supports a bearing 48 for the rotor shaft 19. The bearing 48 therefore has direct radial support, through the members 42, 35, and vanes 30, from the wall 32 of the scroll casing 12.

The clearances between the labyrinth flange 38 on the rotor 20 and the annular stationary walls 35b and 35c must be relatively small to prevent excessive leakage of air through the labyrinth passages, and accurate centering with small clearances is facilitated by the rigid support of the rotor bearing 48 through the members 47, 35, and the vanes 30 directly from the wall 32, which in turn is rigidly secured to the outer wall 10a of the compressor 10.

Although for the purpose of explaining the invention, a particular embodiment thereof has been shown and described, obvious modifications will occur to a person skilled in the art, and I do not desire to be limited to the exact details shown and described.

I claim:

1. A collector structure for the discharge of an axial flow rotary gas compressor having an annular discharge orifice through which gas is discharged in a helical path at high velocity comprising inner and outer wall members diverging from one another and defining an annular passage of progressively increasing cross-sectional area having its upstream inlet end of substantially the same shape and dimensions as and connecting with said annular discharge orifice of said compressor and its downstream outlet end of substantially greater cross-sectional area; circumferentially distributed vanes in said annular passage inclined with respect to the axial direction of said annular passage in the direction of helical flow of the fluid discharged from said compressor discharge orifice and dividing said annular passage into a plurality of substantially helical passages of progressively increasing height extending in the direction of flow of said discharged fluid to maintain the tangential velocity component of the fluid discharged from said compressor discharge orifice and constrain the discharge from said annular passage to follow a circumferential path; and a spirally expanding collector ring surrounding and in complete annular communication with the downstream outlet end of said annular passage and having a tangentially directed discharge passage for tangentially discharging the fluid collected thereby.

2. A collector structure for the discharge of an axial flow rotary gas compressor having an annular discharge orifice through which gas is discharged at high velocity, said collector structure comprising: inner and outer annular wall members defining an annular passage having an upstream end of substantially the same shape and dimensions as and connecting with said annular discharge orifice of said compressor, said outer wall member being of progressively larger diameter in downstream direction whereby said annular passage is of expanding cross-section in downstream direction and said inner wall member extending first axially beyond said outer wall member, then radially outward beyond the outer wall member, then axially upstream past the downstream end of the outer wall member and finally radially inward to the outer wall member to define a spirally expanding collector ring surrounding and in complete annular communication with the downstream end of said annular passage; and circumferentially distributed vanes in said annular passage extending between said inner and outer wall members, each of said vanes being inclined with respect to an axial plane passing therethrough whereby said vanes divide said annular passage into a plurality of substantially helically extending passages of uniform dimensions circumferentially, but of expanding dimensions radially in downstream direction.

3. A collector structure according to claim 2 in which said vanes are substantially shorter axially than said annular passage in which they are located.

4. A collector structure according to claim 3 in which said vanes are substantially flat.

5. A collector structure according to claim 2 in which said vanes are substantially flat.

6. In an axial flow rotary gas compressor: an outer casing having at the discharge end an outwardly flaring internal surface; an inner casing member detachable from said outer casing and having an outer surface spaced radially inward from said internal surface and defining therewith an annular discharge passage for said compressor; means for rotatably supporting a compressor rotor including a bearing within and radially supported by said inner casing member; said inner casing member having projecting from its said outer surface circumferentially distributed vanes the outer end surfaces of which are so shaped as to wedge against said flaring internal surface of said outer casing when said inner casing member is assembled with said outer casing; and means for retaining said inner and outer casing members in assembled relation whereby said bearing is afforded radial support by said outer casing member through said vanes.

7. A collector for the discharge of an axial flow rotary gas compressor having an annular discharge orifice through which gas is discharged at substantial pressure and velocity, said collector structure comprising: an annular collecting ring downstream from and of larger diameter than said orifice; and duct means connecting said orifice into the inner side of said collecting ring, said duct means defining an annular passage the upstream end of which connects with said orifice and the downstream end of which connects with said collecting ring, the inner wall of said passage being of approximately uniform diameter longitudinally, and the outer wall of the said annular passage being of expanding diameter in downstream direction; and substantially flat vanes circumferentially distributed in said annular passage between said inner and outer walls and inclined with respect to the axis of said passage to direct the gas in an approximately helical path, whereby said annular passage is broken up into a plurality of circumferentially distributed passages each of which is of substantially uniform circumferential dimensions from end to end but expands radially in downstream direction.

LEON R. WOSIKA.

REFERENCES CITED

The following references are of record in the file of this patent:

UNITED STATES PATENTS

| Number | Name | Date |
|---|---|---|
| 1,192,857 | Caldwell et al. | Aug. 1, 1916 |
| 2,125,120 | McMahan | July 26, 1938 |
| 2,217,944 | Collicutt | Oct. 15, 1940 |
| 2,314,438 | Banning | Mar. 23, 1943 |
| 2,435,528 | Barlow | Feb. 3, 1948 |
| 2,474,258 | Kroon | June 28, 1948 |